Figure 1:
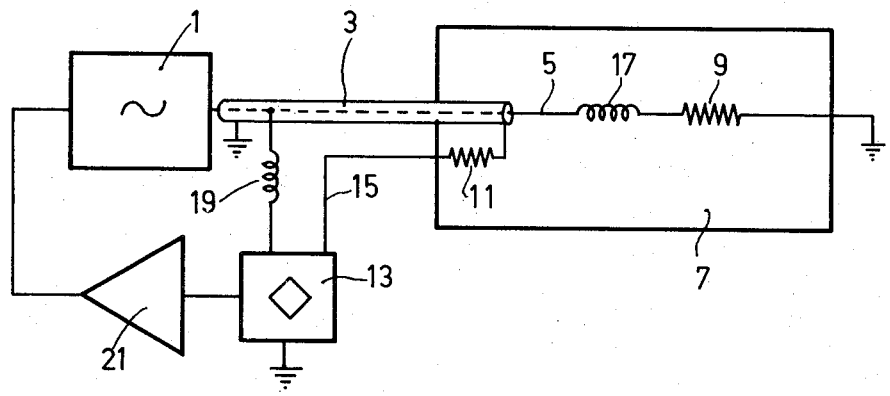

United States Patent [19]
Gieles et al.

[11] 3,798,967
[45] Mar. 26, 1974

[54] PROBE FOR MEASURING THE FLOW OF LIQUIDS

[75] Inventors: Antonius Cornelis Maria Gieles; Gerardus Henricus Johannus Somers, both of Emmasingel, Eindhoven, Netherlands

[73] Assignee: U.S. Philips Corporation, New york, N.Y.

[22] Filed: Apr. 13, 1972

[21] Appl. No.: 243,597

[30] Foreign Application Priority Data
Apr. 21, 1971   Netherlands...................... 7105351

[52] U.S. Cl.............................. 73/204, 128/2.05 F
[51] Int. Cl............................ G01f 1/00, A61b 5/02
[58] Field of Search..................... 73/204; 128/2.05; 219/10.51, 10.55

[56] References Cited
UNITED STATES PATENTS

| | | | |
|---|---|---|---|
| 3,075,515 | 1/1963 | Richards............................... | 73/204 |
| 3,019,647 | 2/1962 | Beard et al. ......................... | 73/204 |
| 3,359,974 | 12/1967 | Khalil................................ | 128/2.05 |
| 3,092,514 | 6/1963 | Tomberlin ....................... | 219/10.55 |
| 2,650,496 | 9/1953 | Middleton et al. .................. | 73/204 |
| 2,729,976 | 1/1956 | Laub..................................... | 73/204 |
| 3,230,957 | 1/1966 | Seifert................................ | 128/407 |
| 3,498,127 | 3/1970 | Richards.............................. | 73/204 |

*Primary Examiner*—Herbert Goldstein
*Attorney, Agent, or Firm*—Frank R. Trifari

[57]   ABSTRACT

A probe for measuring flow rates of liquids whereby the liquid is locally heated by high-frequency heating and the temperature increase is sensed, the temperature increase being a measure of the flow rate.

8 Claims, 2 Drawing Figures

PROBE FOR MEASURING THE FLOW OF LIQUIDS

The invention relates to a method of measuring the flow rate of a liquid flowing through a duct, in particular of blood flowing through a blood vessel, whereby the liquid is locally heated and the resulting temperature increase of the liquid is measured, and to a probe for use in this method.

It is known (see, for example, S. Katsura et al, IRE Transactions on Medical Electronics, December 1959, pages 283 – 285) to heat the liquid locally by sumberging a resistor in the liquid which is then heated by an electric current.

An advantage of this method is that both the heat supply and the temperature measurement can be electrically effected, so that the required equipment may be comparatively simple. Moreover, it is not necessary to add auxiliary substances to the liquid for the measurement which might contaminate the liquid.

The known method, however, has the drawback that some liquids can be adversely affected by contact with the hot resistor surface. For example, blood shows a tendency to coagulate under such circumstances.

The invention has for its object to provide a method which obviates this drawback while maintaining said advantages. According to the invention, this object is achieved in that the heating of the liquid is effected by the locally supplying energy to the liquid, originating from a high-frequency generator, said energy being converted into heat in the liquid itself. The energy can be supplied, for example, in the form of electromagnetic radiation at a frequency of a few GHz. Another possibility is to supply the energy via a capacitor, the dielectric thereof being formed by the liquid to be heated.

The invention also has for its object to provide a probe for performing the method set forth. The probe is provided with a member which is introduced into the liquid and which is connected to a high-frequency generator so as to receive high-frequency energy. This member can be constructed as an electromagnetic radiator which preferably has the shape of a rod, the length of which is equal to half the wavelength of the electromagnetic radiation of the frequency used in the liquid. For electromagnetic radiation having a frequency of 2.5 GHz, the wavelength in blood is 16 mm, so that a rod having a length of 8 mm is suitable. A rod of such dimensions can be readily introduced into a blood vessel.

The said member may also be a capcaitor whose dielectric is the liquid to be heated.

The invention will be described in detail with reference to the accompanying drawing. Therein, FIG. 1 is a diagrammatic view of the electrical construction of a device according to the invention, and FIG. 2 is a longitudinal sectional view of a liquid duct in which the flow rate of the liquid is measured according to the invention.

Figure 2:
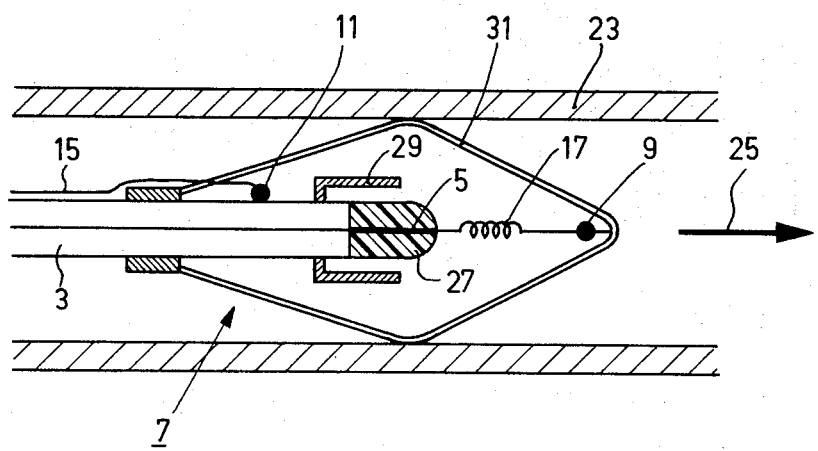

The device shown in FIG. 1 comprises a generator 1 for generating energy in the form of electromagnetic vibrations of a frequency of a few GHz. This energy is applied, via a coaxial cable 3, to a rod-shaped radiator 5, the length of which is equal to half the wavelength of the radiation of the frequency used in the liquid to be examined. The radiator 5 and some other component are assembled to form a probe 7 which can be introduced in a liquid duct. Among these components are two temperature-dependent resistors 9 and 11. The radiator 5 radiates energy which is converted into heat in the liquid. Assuming that the resistor 9 is arranged downstream from the radiator 5, the liquid flowing past this resistor will become warmer so that the resistor also becomes warmer with the result that the resistance changes. In order to compensate for temperature variations in the liquid which are not caused by radiation from the radiator 5, the temperature-dependent resistor 11 is provided upstream from the radiator. At a given power radiated by the radiator 5, the temperature difference between the resistors 9 and 11 is dependent upon the flow rate of the liquid. Resistance variations of the reistor 9 with respect to the resistor 11 can be measured in that both resistors are connected to any known circuit 13 for measuring resistances, for example, a Wheatstone bridge. To this end, the resistor 11 is directly connected to the bridge 13 via a conductor 15, while the resistor 9 is connected, via an isolating choke 17, to the radiator 5 and hence to the inner conductor of the coaxial cable 3, the said inner conductor being connected to the bridge 13 via an isolating choke 19. Furthermore, the resistors 9 and 11 are connected to each other because they are grounded.

The isolating chokes 17 and 19 serve to prevent the high-frequency currents generated by the generator 1 from reaching the resistor 9 and the bridge 13. It is thus possible to use the inner conductor of the coaxial cable for these high-frequency currents as well as for the currents utilized in the bridge 13. The bridge 13 is supplied with a direct current or with an alternating current of low frequency (for example, a few KHz).

The output voltage of the bridge 13, being dependent upon the difference between the resistors 9 and 11, is used, via an amplifier 21, for controlling the power output of the generator 1. This control is well-known and need not be described in detail in this context. The power supplied by the generator 1 is preferably controlled such that the temperature difference between the resistors 9 and 11 remains constant. The power to be supplied by the generator for keeping this temperature constant is then proportional to the flow rate of the liquid. The adjusted temperature difference obviously depends on the kind of liquid. For measuring the flow rate of blood, a temperature difference of 0.1°C was found to be very suitable.

FIG. 2 shows the mechanical construction of the probe 7. The coaxial cable 3 is inserted into a tube 23, for example, a blood vessel, through which liquid flows in the direction of the arrow 25. The radiator 5 may be a rod which is soldered to the inner core of the coaxial cable 3, or a portion of this inner core whose jacket has been removed. The radiator 5 is enveloped by a collar 27 which serves as an intermediary between the radiator and the liquid. The dielectric constant $\epsilon_m$ of the material of the collar 27 should preferably relate to the dielectric constants $\epsilon_l$ of air and $\epsilon_v$ of the liquid as follows:

$$\epsilon_m = \sqrt{\epsilon_l \epsilon_v}$$

For blood, $\epsilon_v = 64$, while $\epsilon_l = 1$, so that preferably $\epsilon_m = 8$. A suitable approximation thereof is the dielectric constant of polytetrafluoroethylene which amounts to 7.7.

In order to prevent standing waves from occurring along the outer surface of the jacket of the coaxial cable 3, a metal shield 29 is provided which is grounded via the jacket and which envelops the junction between the coaxial cable and the radiator 5.

The radiator 5 is kept approximately in the centre of the tube 23 by a cage which is formed by elastic ribs 31. Via this (metal) cage, the resistor 9 is connected to the jacket of the coaxial cable 3. The ribs 31 also screen the outward radiation of the high-frequency field. Substantially the same probe as described above for supplying the energy in the form of radiation can also be used for supplying energy via the electrical field of a capacitor. In that case the two electrodes of the capacitor are formed by the rod 5 and the ribs 31. The dimension of the rod 5 may then be independent of the frequency used. In that case it is also possible to use a lower frequency, for example, a few hundred MHz, so that standing waves are less liable to occur along the jacket surface, with the result that the shield 29 can be dispensed with. The collar 27 is also superfluous in the case of the capacitor. The shape of the capacitor electrodes is not critical and may deviate from the shape set forth without objection, if desired. In its most general form, the capacitor simply consists of two conductors, between which liquid is situated, one of said conductors being connected to the inner core of the coaxial cable 3, the second conductor being connected to the jacket of the coaxial cable.

What is claimed is:

1. A probe for use in measuring the flow rate of a liquid through a duct comprising a cage through which liquid may flow, a coaxial cable extending from without to within said cage the outer jacket of said cable being connected to said cage, an electrode positioned within said cage and connected to the inner core of said cable, and a temperature dependent resistance electrically connected between said cage and the inner core of said cable, whereby said probe may be supplied with high frequency electrical power via said cable thus creating an energy field within said cage which heats liquid flowing through said cage, and whereby said resistance is positioned to measure the temperature of liquid flowing out of said cage.

2. A probe as in claim 1 further characterized by a second temperature dependent resistance positioned to measure the temperature of liquid flowing into said cage.

3. A probe as in claim 2 wherein said electrode is an electromagnetic radiator.

4. A probe as in claim 1 wherein said liquid is blood and said duct is a blood vessel.

5. Apparatus for measuring the flow rate of a liquid through a duct, comprising a cage through which liquid may flow, a coaxial cable extending from without to within said cage, the outer jacket of said cable being connected to said cage, an electrode positioned centrally within said cage and connected to the inner core of said cable, a first choke and a first temperature dependent resistance electrically connected in series between said cage and the inner core of said cable and positioned within said cage to measure the temperature of liquid flowing out of said cage, a second temperature dependent resistance positioned within said cage to measure the temperature of liquid flowing into said cage, one end of said second resistance being electrically connected to the jacket of said cable and the other end being available external to said cage, a second choke, one end of said second choke being electrically connected to the core of said cable, a high frequency power source connected to the end of said cable external to said cage, and a resistance measuring circuit electrically connected between the externally available end of said second resistance and the other end of said second choke to measure the difference in temperature between liquid flowing into and out of said cage, whereby said power source produces an energy field within said cage thus heating liquid flowing through said cage the difference in temperature thereof at constant heating being proportional to the flow rate of the liquid, said difference being measured by said circuit.

6. Apparatus as in claim 5 wherein said electrode is an electromagnetic radiator.

7. Apparatus as in claim 5 including means for controlling the output of said power source to produce a substantially constant temperature difference, the flow rate of said liquid being proportional to said controlled output.

8. Apparatus as in claim 5 wherein the liquid is blood and the duct is a blood vessel.

* * * * *